United States Patent
Matsubara (10) Patent No.: US 7,822,534 B2
(45) Date of Patent: Oct. 26, 2010

(54) FUEL SUPPLY DEVICE AND FUEL SUPPLY METHOD FOR INTERNAL COMBUSTION ENGINE

(75) Inventor: Takuji Matsubara, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 240 days.

(21) Appl. No.: 12/085,465

(22) PCT Filed: Feb. 26, 2007

(86) PCT No.: PCT/IB2007/000444

§ 371 (c)(1),
(2), (4) Date: May 23, 2008

(87) PCT Pub. No.: WO2007/096759

PCT Pub. Date: Aug. 30, 2007

(65) Prior Publication Data

US 2009/0271096 A1    Oct. 29, 2009

(30) Foreign Application Priority Data

Feb. 27, 2006    (JP)    .............................. 2006-050989

(51) Int. Cl.
*G06F 19/00* (2006.01)
*F02M 63/02* (2006.01)
*F02M 59/46* (2006.01)
*F01N 3/20* (2006.01)

(52) U.S. Cl. ...................... 701/112; 701/113; 123/447; 123/467; 123/198 DB; 60/286

(58) Field of Classification Search ............... 123/447, 123/456–459, 198 D, 198 DB, 467, 179.16, 123/179.17, 179.3, 179.4; 701/101–105, 701/112, 113, 115; 60/274, 286
See application file for complete search history.

(56) References Cited

U.S. PATENT DOCUMENTS 4,161,161 A * 7/1979 Bastenhof ................... 123/447

(Continued)

FOREIGN PATENT DOCUMENTS

JP    9-151827    6/1997

(Continued)

OTHER PUBLICATIONS

International Search Report.

(Continued)

*Primary Examiner*—Willis R Wolfe, Jr.
(74) *Attorney, Agent, or Firm*—Finnegan, Henderson, Farabow, Garrett & Dunner, LLP (57) ABSTRACT

A fuel supply device (30) for an engine (1) pressurizes the fuel drawn up from a fuel tank (31) by the low-pressure fuel pump (32) and stores it in a delivery pipe (34), and injects the fuel stored in the delivery pipe (34) from an injector (35). The fuel supply device (30) includes a return passageway (50) connecting the delivery pipe (34) and the fuel tank (31), and a relief valve (51) that is provided on the return passageway (50) and that is capable of being switched between an open state for connecting the delivery pipe (34) and the fuel tank (31) in communication and a closed state for shutting off the delivery pipe (34) and the fuel tank (31) from each other in communication. An ECU (60) switches the relief valve (51) to the open state and operates the low-pressure fuel pump (32), if a predetermined stop condition for stopping the engine (1) is satisfied.

12 Claims, 7 Drawing Sheets

U.S. PATENT DOCUMENTS

| | | | |
|---|---|---|---|
| 4,601,274 A * | 7/1986 | Seilly | 123/447 |
| 5,213,481 A * | 5/1993 | Stringfellow et al. | 123/450 |
| 5,651,346 A * | 7/1997 | Remmels et al. | 123/447 |
| 6,112,721 A * | 9/2000 | Kouketsu et al. | 123/447 |
| 6,948,480 B2 * | 9/2005 | Eser et al. | 123/198 D |
| 2001/0007248 A1 | 7/2001 | Kato | |
| 2003/0098016 A1 | 5/2003 | Rembold et al. | |
| 2005/0056258 A1 | 3/2005 | Sekiya et al. | |
| 2005/0092302 A1 | 5/2005 | Kojima | |

FOREIGN PATENT DOCUMENTS

| | | | |
|---|---|---|---|
| JP | 09209870 A * | 8/1997 | 123/447 |
| JP | 10-54319 | 2/1998 | |
| JP | 63-100669 | 6/1999 | |
| JP | 2004-84560 | 3/2004 | |
| JP | 2006-29271 | 2/2006 | |

OTHER PUBLICATIONS

Written Opinion of the ISR.

Japanese Office Action issued Jan. 6, 2009.

* cited by examiner

FUEL SUPPLY DEVICE AND FUEL SUPPLY METHOD FOR INTERNAL COMBUSTION ENGINE

BACKGROUND OF THE INVENTION

1. Field of the Invention

The invention relates to a fuel supply device and a fuel supply method for an internal combustion engine.

2. Description of the Related Art

Japanese Patent Application Publication No. JP-A-2004-84560 discloses a fuel supply device for an internal combustion engine in which the fuel drawn up from a fuel tank by a low-pressure fuel pump is pressurized and fed to a delivery pipe by a high-pressure fuel pump, and the fuel in the delivery pipe is supplied into combustion chambers via injectors. When the internal combustion engine is about to be stopped, this fuel supply device stops the high-pressure fuel pump but continues the injecting operation of the injectors and the operation of the low-pressure pump to lower the pressure of fuel in the delivery pipe so that leakage of fuel from the injectors is curbed during the period of the stop of the internal combustion engine. Another related-art document relevant to the invention is Japanese Patent Application Publication No. JP-A-9-151827.

According to the aforementioned device of Japanese Patent Application Publication No. JP-A-2004-84560, the fuel injection into the combustion chambers and the combustion of injected fuel are continued during a period from the occurrence of a stop signal for the internal combustion engine in response to the turning-off of the ignition key until the pressure in the delivery pipe (hereinafter, sometimes referred to as "pressure accumulator") drops. Therefore, there is risk of giving a driver an awkward impression that the internal combustion engine continues operating when the driver has turned off the ignition key. Japanese Patent Application Publication No. JP-A-9-151827 mentioned above does not disclose a control of the pressure in the delivery pipe at the time of stopping the internal combustion engine.

SUMMARY OF THE INVENTION

It is an object of the invention to provide a fuel supply device and a fuel supply method for an internal combustion engine which is capable of curbing leakage of fuel from a fuel injection valve by lowering the pressure in the accumulator without giving a driver an awkward impression when the internal combustion engine is stopped.

A first aspect of the invention relates to a fuel supply device for an internal combustion engine in which fuel drawn up from a fuel tank by a fuel feed pump is pressurized and stored in a pressure accumulator and the fuel stored in the pressure accumulator is injected from a fuel injection valve. This fuel supply device includes a return passageway connecting the pressure accumulator and the fuel tank; a control valve that is provided on the return passageway and that is switched between a communicating position for connecting the pressure accumulator and the fuel tank in communication and a shutting-off position for shutting off the pressure accumulator and the fuel tank from each other in communication; and operation control means for switching the control valve to the communicating position and operating the fuel feed pump if a predetermined stop condition for stopping the internal combustion engine is satisfied.

According to the foregoing constitution, when the internal combustion engine is stopped, the control valve is switched to the communicating position, so that fuel in the pressure accumulator can be returned to the fuel tank and therefore the pressure of the pressure accumulator can be lowered. Therefore, the leakage of fuel from the fuel injection valve during stop of the internal combustion engine can be curbed. Furthermore, since the pressure of the pressure accumulator is lowered by returning fuel from the pressure accumulator to the fuel tank, the internal combustion engine can be promptly stopped after the predetermined stop condition is satisfied. Therefore, an awkward impression is not given to a driver. Furthermore, since the fuel feed pump is operated, portions of the fuel supply device, such as the pressure accumulator or the like, that are generally disposed near the engine body of the internal combustion engine are supplied with cold fuel from the fuel tank, and therefore can be cooled. Therefore, the vaporization of fuel in the pressure accumulator is curbed, so that the occurrence of fuel vapor can be curbed.

In the first aspect of the invention, if the predetermined stop condition is satisfied, the operation control means may firstly switch the control valve to the communicating position and may operate the fuel feed pump, and then may switch the control valve to the shutting-off position and may operate the fuel feed pump. In this case, a certain amount of fuel can reliably be caused to remain in the pressure accumulator when the internal combustion engine is stopped. Therefore, the next time the engine is started up, the pressure in the pressure accumulator can be promptly raised, so that fuel can be promptly injected from the fuel injection valve.

In the first aspect of the invention, the fuel supply device may further include ejection pressure change means for changing an ejection pressure of the fuel feed pump so that the ejection pressure of the fuel feed pump when the fuel feed pump is operated with the control valve switched to the communicating position is higher than the ejection pressure of the fuel feed pump when the fuel feed pump is operated with the control valve switched to the shutting-off position. In this case, since the ejection pressure of the fuel feed pump when the control valve is in the communicating position is set higher, an increased amount of fuel can be supplied from the fuel tank to the pressure accumulator. Therefore, the cooling of portions of the fuel supply device, such as the pressure accumulator and the like, that are disposed near the engine body can be accelerated, and the occurrence of fuel vapor can be further curbed. On the other hand, when the control valve is in the shutting-off position, the ejection pressure of the fuel feed pump is set low, so that the rise in the pressure in the pressure accumulator after the control valve is switched to the shutting-off position can be curbed. Therefore, the leakage of fuel from the fuel injection valve can be curbed.

In the first aspect of the invention, the fuel supply device may further include pressure detection means for detecting a pressure in the pressure accumulator, and the operation control means controls an operation of the control valve based on the pressure detected by the pressure detection means, if the predetermined stop condition is satisfied. In this case, the pressure in the pressure accumulator while the internal combustion engine is at a stop can be appropriately adjusted to a pressure that can be promptly raised appropriately the next time the engine is started up.

In this constitution, the operation control means may switch the control valve to the communicating position if the predetermined stop condition is satisfied and the pressure detected by the pressure detection means is higher than a predetermined criterion pressure that is set taking into account a startup characteristic of the internal combustion engine, and the operation control means may switch the control valve to the shutting-off position if the predetermined stop condition is satisfied and the pressure detected by the pressure detection means is less than or equal to the predetermined criterion pressure. By operating the control valve in this manner, the pressure in the pressure accumulator while the internal combustion engine is at a stop can be adjusted to the predetermined criterion pressure. Therefore, the next time the engine is started up, fuel can be promptly injected from the fuel injection valve.

In the first aspect of the invention, if a predetermined startup condition for starting up the internal combustion engine is satisfied, the operation control means may provide a fuel circulation period during which the control valve is switched to the communicating position and the fuel feed pump is operated, within a period from satisfaction of the predetermined startup condition until fuel is injected from the fuel injection valve. In this case, when the internal combustion engine is started up, fuel vapor can be discharged from the pressure accumulator, so that the pressure in the pressure accumulator can be promptly raised. Furthermore, since the fuel to be injected from the fuel injection valve can be promptly secured in the pressure accumulator, the internal combustion engine can be promptly started up. Since the fuel feed pump is operated with the control valve switched to the communicating position, the leakage of fuel from the fuel injection valve is curbed, so that deterioration of exhaust emission can be prevented.

In the first aspect of the invention, the operation control means may provide a delayed startup mode that prevents inflow of hydrocarbon to an exhaust catalyst of the internal combustion engine which is in a catalytically inactive state if the predetermined startup condition for starting up the internal combustion engine is satisfied.

In the first aspect of the invention, the predetermined stop condition may be set based on at least one of a speed of a vehicle in which the internal combustion engine is mounted, an idle operation time of the internal combustion engine, an on/off state of the an ignition switch of the vehicle.

As described above, according to the first aspect of the invention, when the internal combustion engine is to be stopped, the control valve is switched to the communicating position to return fuel from the pressure accumulator to the fuel tank, lowering the pressure in the pressure accumulator. The leakage of fuel from the fuel injection valve while the internal combustion engine is at a stop can be curbed. Furthermore, since the fuel pressure in the pressure accumulator is lowered by returning fuel from the pressure accumulator to the fuel tank, the internal combustion engine is promptly stopped after the predetermined stop condition is satisfied. Thus, an awkward impression is not given to a driver. Furthermore, since the fuel feed pump is operated with the control valve switched to the communicating position, the cold fuel from the fuel tank accelerates the cooling of portions of the fuel supply device, such as the pressure accumulator and the like, that are disposed near the engine body of the internal combustion engine. Therefore, the occurrence of fuel vapor in the pressure accumulator can be curbed.

A second aspect of the invention relates to a fuel supply method for an internal combustion engine in which fuel drawn up from a fuel tank by a fuel feed pump is pressurized and stored in a pressure accumulator and the fuel stored in the pressure accumulator is injected from a fuel injection valve. In this method, the pressure accumulator and the fuel tank are connected to each other in communication if a predetermined stop condition for stopping the internal combustion engine is satisfied. Furthermore, the pressure accumulator and the fuel tank are shut off from each other in communication if the predetermined stop condition is not satisfied.

In the second aspect of the invention, if the predetermined stop condition is satisfied, firstly the pressure accumulator and the fuel tank may be connected in communication and the fuel feed pump may be operated, and then the pressure accumulator and the fuel tank may be shut off from each other in communication and the fuel feed pump may be operated.

In the second aspect of the invention, an ejection pressure of the fuel feed pump may be changed so that the ejection pressure of the fuel feed pump when the fuel feed pump is operated with the pressure accumulator and the fuel tank connected to each other in communication is higher than the ejection pressure of the fuel feed pump when the fuel feed pump is operated with the pressure accumulator and the fuel tank shut off from each other in communication.

In the second aspect of the invention, a pressure in the pressure accumulator may be detected, and the connection/shutting-off of communication between the pressure accumulator and the fuel tank may be controlled if the predetermined stop condition is satisfied.

In the second aspect of the invention, the pressure accumulator and the fuel tank may be connected in communication if the predetermined stop condition is satisfied and the pressure detected by the pressure detection means is higher than a predetermined criterion pressure that is set taking into account a startup characteristic of the internal combustion engine, and the pressure accumulator and the fuel tank may be shut off from each other in communication if the predetermined stop condition is satisfied and the pressure detected by the pressure detection means is less than or equal to the predetermined criterion pressure.

In the second aspect of the invention, if a predetermined startup condition for starting up the internal combustion engine is satisfied, a fuel circulation period during which the pressure accumulator and the fuel tank are connected in communication and the fuel feed pump is operated may be set within a period from satisfaction of the predetermined startup condition until fuel is injected from the fuel injection valve.

A third aspect of the invention relates to a fuel supply device for an internal combustion engine. This device includes a fuel pressurization control portion that pressurizes fuel drawn up from a fuel tank by a fuel feed pump, and stores the fuel in a pressure accumulator; a fuel injection control portion that injects the fuel stored in the pressure accumulator from a fuel injection valve; a return passageway connecting the pressure accumulator and the fuel tank; a control valve that is provided on the return passageway and that is switched between a communicating position for connecting the pressure accumulator and the fuel tank in communication and a shutting-off position for shutting off the pressure accumulator and the fuel tank from each other in communication; and an operation control portion that switches the control valve to the communicating position and operates the fuel feed pump if a predetermined stop condition for stopping the internal combustion engine is satisfied.

A fourth aspect of the invention relates to a fuel supply method for an internal combustion engine. This method includes: pressurizing fuel drawn up from a fuel tank by a fuel feed pump, and storing the fuel in a pressure accumulator; injecting the fuel stored in the pressure accumulator from a fuel injection valve; connecting the pressure accumulator and the fuel tank to each other in communication if a predetermined stop condition for stopping the internal combustion engine is satisfied; and shutting off the pressure accumulator and the fuel tank from each other in communication if the predetermined stop condition is not satisfied.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
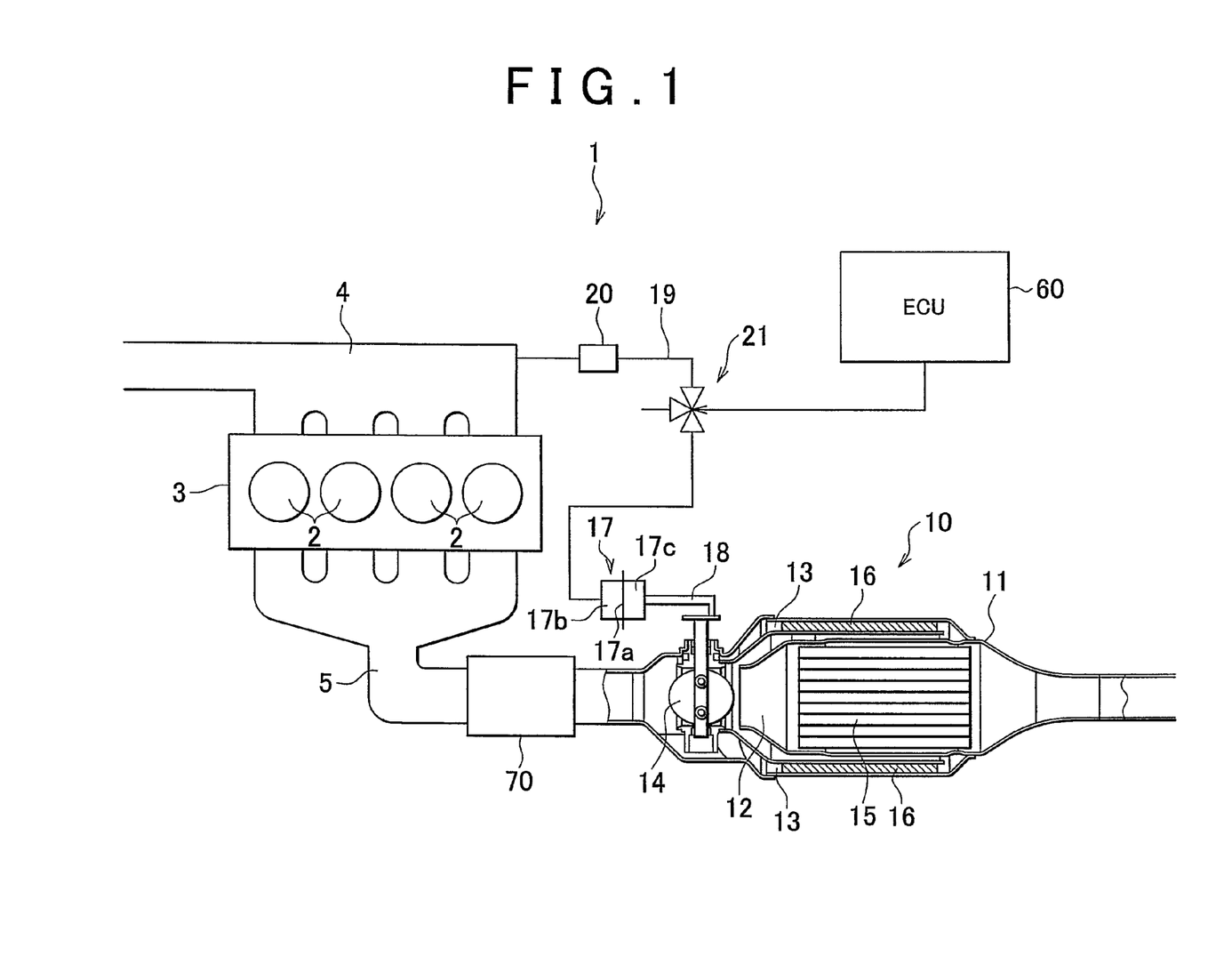
FIG. 1 is a diagram showing an internal combustion engine incorporating a fuel supply device of an embodiment of the invention.

FIG. 1 is a diagram showing an internal combustion engine incorporating a fuel supply device of an embodiment of the invention. An internal combustion engine 1 shown in FIG. 1 includes an engine body 3 that is mounted in a vehicle as a vehicle-running power source and is provided with a plurality of cylinders 2 (four cylinders in FIG. 1), an intake passageway 4 and an exhaust passageway 5 that are connected to each of the cylinders 2, an exhaust purification device 10, and a fuel supply device 30 (see FIG. 4).

Figure 2:
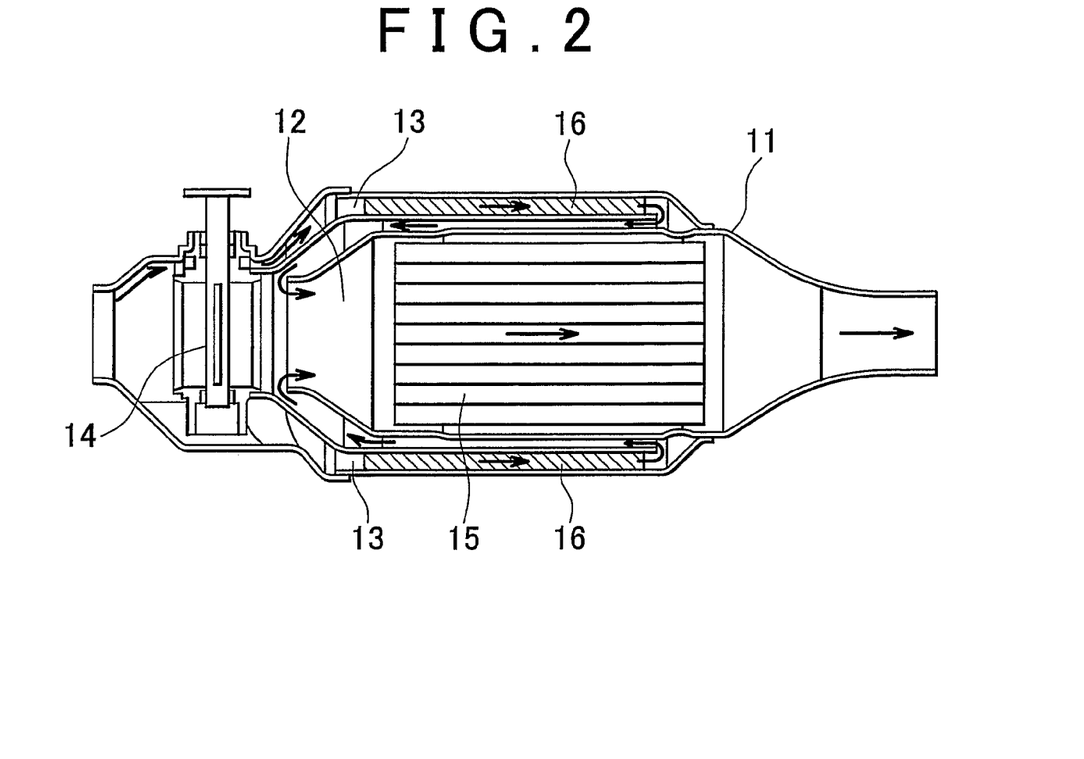
FIG. 2 is a diagram showing a casing when a switching valve is in a closed valve position.
Figure 3:
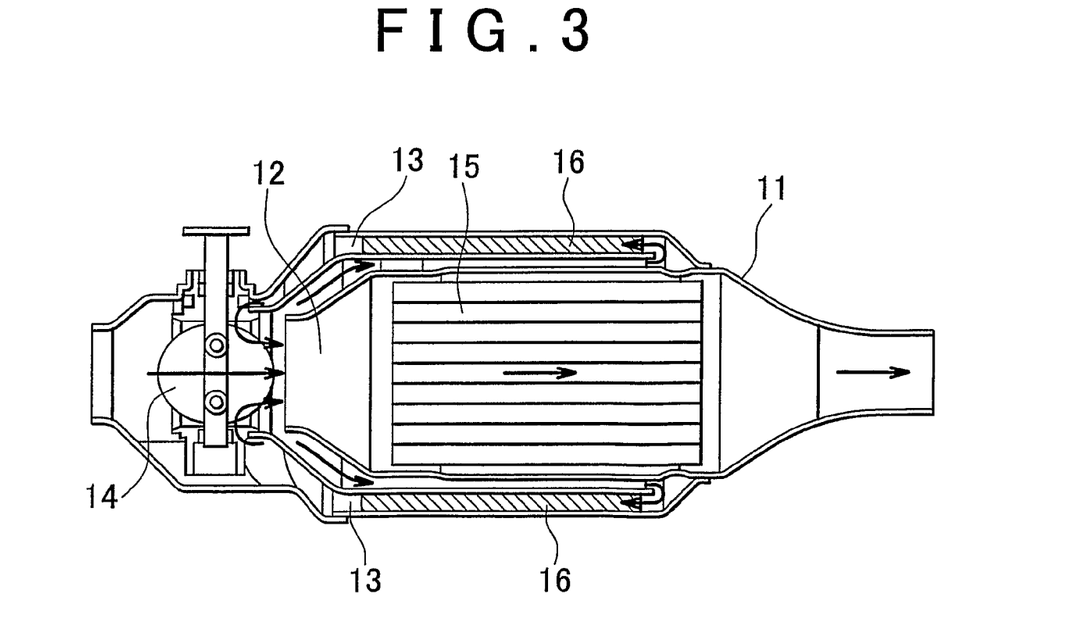
FIG. 3 is a diagram showing the casing when the switching valve is in an open valve position.

With reference to FIG. 2 and FIG. 3, the exhaust purification device 10 will be described. In FIG. 2 and FIG. 3, each arrow shows the flow of exhaust. The exhaust purification device 10 includes a casing 11 that forms a portion of the exhaust passageway 5. The casing 11 includes a first passageway 12 that is formed in a central portion of the casing 11, a second passageway 13 that is formed on an outer periphery of the first passageway 12, and a switching valve 14 that switches the flow of exhaust within the casing 11. The first passageway 12 is provided with an exhaust purification catalyst 15, such as a three-way catalyst or the like, and the second passageway 13 is provided with a hydrocarbon adsorbent (hereinafter, sometimes referred to as "HC adsorbent") 16. The HC adsorbent 16 adsorbs hydrocarbon (hereinafter, sometimes referred to as "HC") at low temperatures, and releases HC when the temperature is higher than a predetermined temperature, as well known. The switching valve 14 is driven between a closed valve position in which the valve restricts the flow of exhaust so that exhaust passes through the second passageway 13 and the first passageway 12 in that order as shown in FIG. 2, and an open valve position in which the valve allows exhaust to be guided separately into the first passageway 12 and into the second passageway 13 as shown in FIG. 3. When the switching valve 14 is in the closed valve position, exhaust passes through the HC adsorbent 16, and then is guided into the exhaust purification catalyst 15, whereby the exhaust is purified. On the other hand, when the switching valve 14 is in the open valve position, the exhaust guided by the first passageway 12 is purified by the exhaust purification catalyst 15, and the exhaust guided into the second passageway 13 passes through the HC adsorbent 16, and then is guided into the exhaust purification catalyst 15, whereby the exhaust is purified. As shown in FIG. 3, when the switching valve 14 is in the open valve position, the exhaust guided by the second passageway 13 flows in a direction opposite to the direction of flow of exhaust when the switching valve 14 is in the closed valve position.

As shown in FIG. 1, the exhaust purification device 10 includes a diaphragm mechanism 17 for driving the switching valve 14. The diaphragm mechanism 17 is connected to the switching valve 14 via an actuating rod 18. The interior of the diaphragm mechanism 17 is divided by a diaphragm 17a into a variable pressure chamber 17b and an atmospheric pressure chamber 17c whose internal pressure is kept at an atmospheric pressure. The actuating rod 18 is linked to the diaphragm 17a. The diaphragm mechanism 17 switches the switching valve 14 to the closed valve position when the pressure in the variable pressure chamber 17b is adjusted to a pressure below the atmospheric pressure, and switches the switching valve 14 to the open valve position when the pressure in the variable pressure chamber 17b is adjusted to the atmospheric pressure. The variable pressure chamber 17b and the intake passageway 4 are connected by a negative-pressure passageway 19. The negative-pressure passageway 19 is provided with a check valve 20 and a three-way valve 21.

The check valve 20 is a one-way valve that permits air to flow from the variable pressure chamber 17b to the intake passageway 4 if the pressure in the intake passageway 4 is lower than the pressure in the variable pressure chamber 17b. The three-way valve 21 is capable of being switched between a pressure reducing position in which the valve connects the variable pressure chamber 17b and the intake passageway 4 in communication to lower the pressure in the variable pressure chamber 17b and an atmospherically open position in which the valve shuts off the communication between the variable pressure chamber 17b and the intake passageway 4, and introduces the atmosphere into the variable pressure chamber 17b so as to adjust the pressure in the variable pressure chamber 17b to the atmospheric pressure. That is, by switching the position of the three-way valve 21, the position of the switching valve 14 can be switched. When the three-way valve 21 is switched to the pressure reducing position, the switching valve 14 is switched to the closed valve position. When the three-way valve 21 is switched to the atmospherically open position, the switching valve 14 is switched to the open valve position.

The exhaust purification device 10, as shown in FIG. 1, includes a start catalyst 70 provided in the exhaust passageway 5 on the engine body 3 side of the casing 11. The start catalyst 70 is provided for the purpose of preventing the discharge of harmful substances until the exhaust purification catalyst 15 becomes activated at the time of startup of the engine 1 or the like, and is also called pre-catalyst or preceding catalyst or the like. The start catalyst 70 is, for example, a three-way catalyst or the like, and the capacity thereof is set smaller than the capacity of the exhaust purification catalyst 15.

Figure 4:
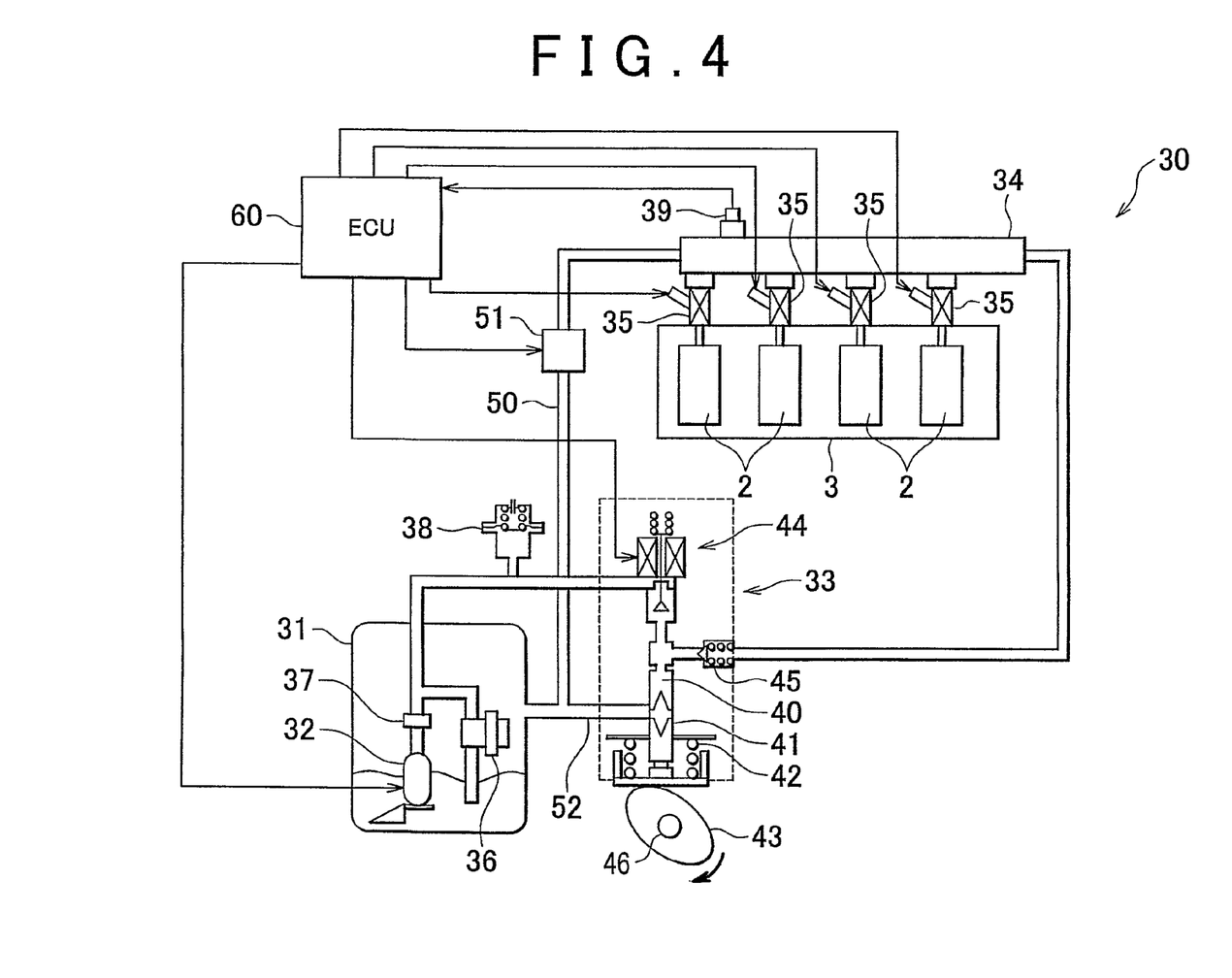
FIG. 4 is a diagram showing a fuel supply device incorporated in the internal combustion engine shown in FIG. 1.

Next, the fuel supply device 30 will be described with reference to FIG. 4. The fuel supply device 30 includes a fuel tank 31, a low-pressure fuel pump 32 as a fuel feed pump, a high-pressure fuel pump 33 for pressurizing fuel, a delivery pipe 34 as a pressure accumulator, and injectors 35 as fuel injection valves connected to the delivery pipe 34. The injectors 35 are provided separately for the individual cylinders 2, and supply pressurized fuel into the cylinders 2. That is, the engine 1 is a so-called direct-injection engine in which fuel is directly injected into the cylinders 2. A passageway between the low-pressure fuel pump 32 and the high-pressure fuel pump 33 is provided with a pressure regulator 36 for adjusting the pressure of fuel in this passageway to or below a predetermined pressure, a fuel filter 37 for filtering fuel, and a pulsation damper 38 for reducing fuel pulsation.

Fuel in the fuel tank 31 is drawn up by the low-pressure fuel pump 32, and then is pressurized by the high-pressure fuel pump 33, and is stored in the delivery pipe 34. The fuel stored in the delivery pipe 34 is injected from the injectors 35 into the cylinders 2 of the engine 1. The ejection pressure of the low-pressure fuel pump 32 is set at, for example, 0.3 to 0.4 MPa. The ejection pressure of the high-pressure fuel pump 33 is set at a pressure (e.g., 6 to 13 MPa) that is higher than the ejection pressure of the low-pressure fuel pump 32. The low-pressure fuel pump 32 is actuated through the use of an electric motor (not shown) as a drive source. Therefore, by controlling the rotation speed of the electric motor or the like, the ejection pressure of the low-pressure fuel pump 32 can be changed. The delivery pipe 34 is provided with a fuel pressure sensor 39 as pressure detection means for outputting a signal that corresponds to the pressure in the delivery pipe 34.

Figure 5:
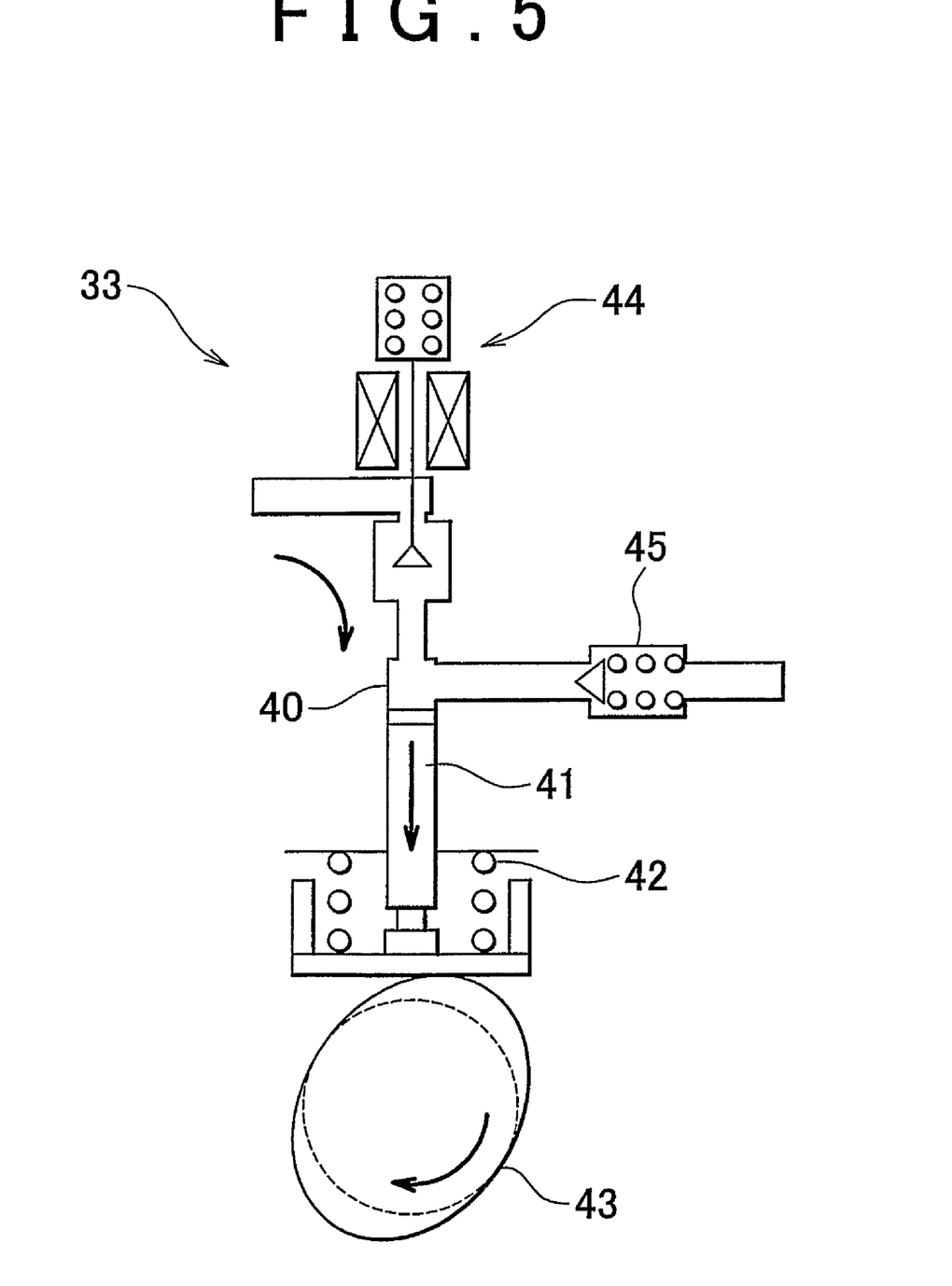
FIG. 5 is a diagram showing a state of a high-pressure fuel pump when fuel is taken into a pump cylinder.
Figure 6:
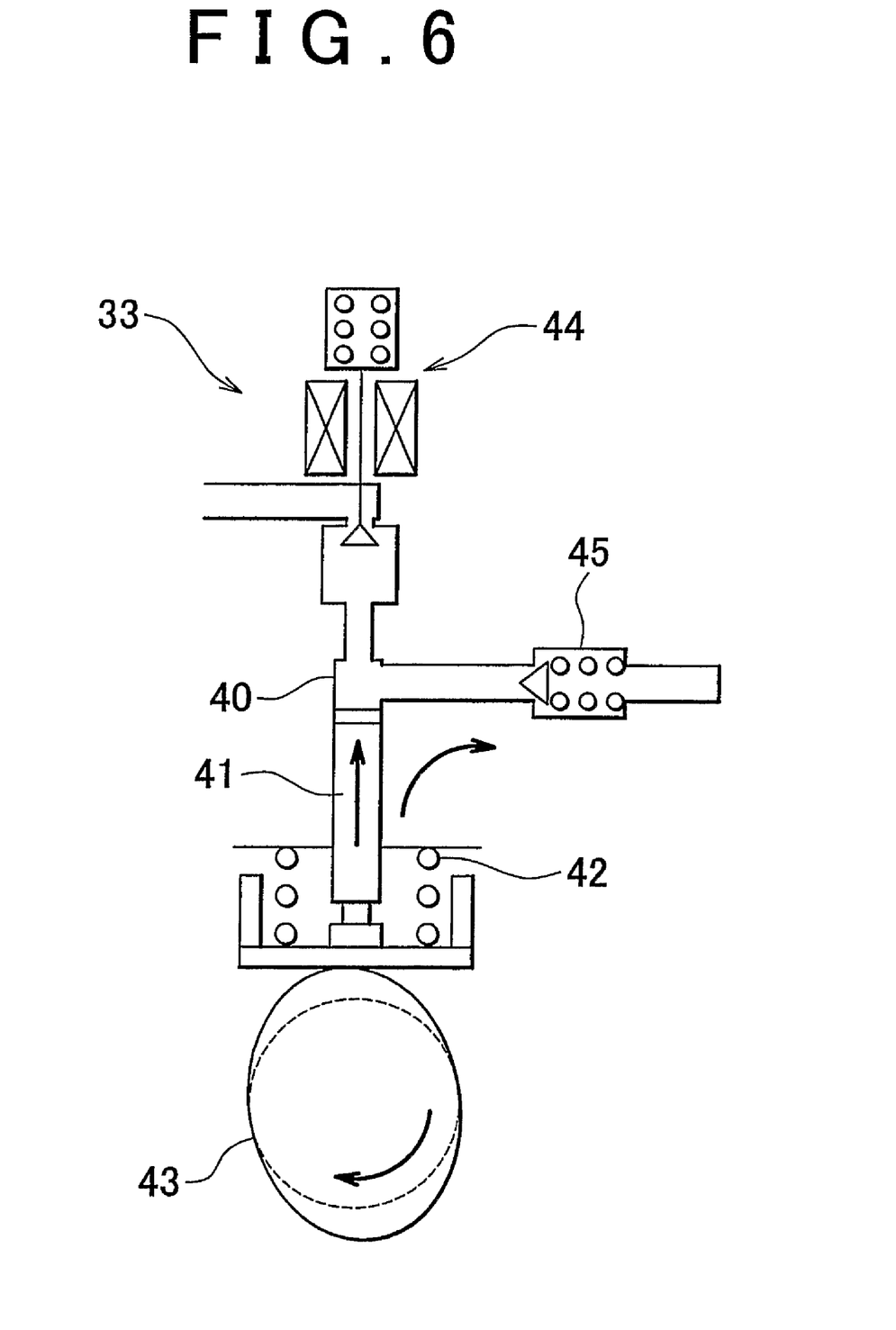
FIG. 6 is a diagram showing a state of the high-pressure fuel pump when fuel is sent out of the pump cylinder to pressurize fuel.

The high-pressure fuel pump 33 will be described with reference to FIG. 5 and FIG. 6. As shown in enlarged views in FIG. 5 and FIG. 6, the high-pressure fuel pump 33 is a so-called plunger pump that sends out fuel by reciprocating a plunger 41 in a pump cylinder 40. Incidentally, FIG. 5 shows a state of the high-pressure fuel pump 33 when fuel is taken into the pump cylinder 40, and FIG. 6 shows a state of the high-pressure fuel pump 33 when fuel is sent out of the pump cylinder 40 to pressurize the fuel. The high-pressure fuel pump 33 includes a spring 42 that urges the plunger 41 downward in FIG. 5 and FIG. 6, a pump driving cam 43 for driving the plunger 41 against the force of the spring 42, an electromagnetic valve 44 for adjusting the amount of fuel taken into the pump cylinder 40, and a check valve 45 for preventing reverse flow of the fuel sent out of the pump cylinder 40. As shown in FIG. 4, the pump driving cam 43 is provided on a camshaft 46 so as to rotate integrally with a camshaft 46 of the engine 1. That is, the high-pressure fuel pump 33 is driven via the camshaft 46 of the engine 1. The high-pressure fuel pump 33 takes fuel into the pump cylinder 40 when the electromagnetic valve 44 is in an open state as shown in FIG. 5 and the plunger 41 is driven downward in FIG. 5 by the spring 42. The high-pressure fuel pump 33 sends out fuel when the electromagnetic valve 44 is in a closed state as shown in FIG. 6 and the plunger 41 is pushed upward in FIG. 6 by the pump driving cam 43.

Referring back to FIG. 4, the fuel supply device 30 will be further described. The delivery pipe 34 and the fuel tank 31 are connected by a return passageway 50. The return passageway 50 is provided with a relief valve 51 as a control valve. The relief valve 51 is, for example, an electromagnetic valve, and connects the delivery pipe 34 and the fuel tank 31 in communication when in an open state, and shuts off the communication between the delivery pipe 34 and the fuel tank 31 when in a closed state. That is, the open state can be regarded as a communicating position in the invention, and the closed state can be regarded as a shutting-off position in the invention. A pump return passageway 52 for returning fuel from the high-pressure fuel pump 33 to the fuel tank 31 is connected to the return passageway 50 toward the fuel tank 31 from the relief valve 51.

The operation of the relief valve 51 and the operation of the low-pressure fuel pump 32 are separately controlled by an engine control unit (ECU) 60. The ECU 60 is a well-known computer unit which is constituted as a computer that includes a microprocessor and peripheral appliances need for the operation thereof, such as a RAM, a ROM, etc., and which controls the operations of the electromagnetic valve 44 of the high-pressure fuel pump 33, the injectors 35, etc., so that the engine 1 is appropriately operating. For example, while the engine 1 is operating, the ECU 60 controls the operation of the electromagnetic valve 44 on the basis of an output signal of a fuel pressure sensor 39 so as to control the pressure of fuel in the delivery pipe 34 within a predetermined pressure range, or controls the operation of the relief valve 51 on the basis of the output signal of the fuel pressure sensor 39 so that the pressure of fuel in the delivery pipe 34 does not exceed a permissible upper-limit pressure.

Furthermore, during the time of cold start when the temperature of the exhaust purification catalyst 15, or the like, the ECU 60 switches the three-way valve 21 to the pressure reducing position so that the switching valve 14 switches to the closed valve position. When the switching valve 14 is in the closed valve position, exhaust passes through the HC adsorbent 16 before being introduced to the exhaust purification catalyst 15, so that HC can be adsorbed to the HC adsorbent 16. Therefore, inflow of HC to the exhaust purification catalyst 15 can be prevented, and deterioration of exhaust emission can be prevented. Incidentally, when the pressure in the intake passageway 4 is atmospheric, the switching of the three-way valve 21 to the pressure reducing position does not switch the switching valve 14 to the closed valve position. In such a case, therefore, the ECU 60 idly runs the engine 1 via a startup motor or the like and prohibits the operations of the injectors 35 and ignition plugs (not shown) so that fuel does not burn in the cylinders 2, until the pressure in the intake passageway 4 drops so that the switching valve 14 switches to the closed valve position. In this embodiment, the period during which the operations of the injectors 35 and the like are prohibited and the engine 1 is idly run at the time of startup of the engine is termed delayed startup mode.

Figure 7:
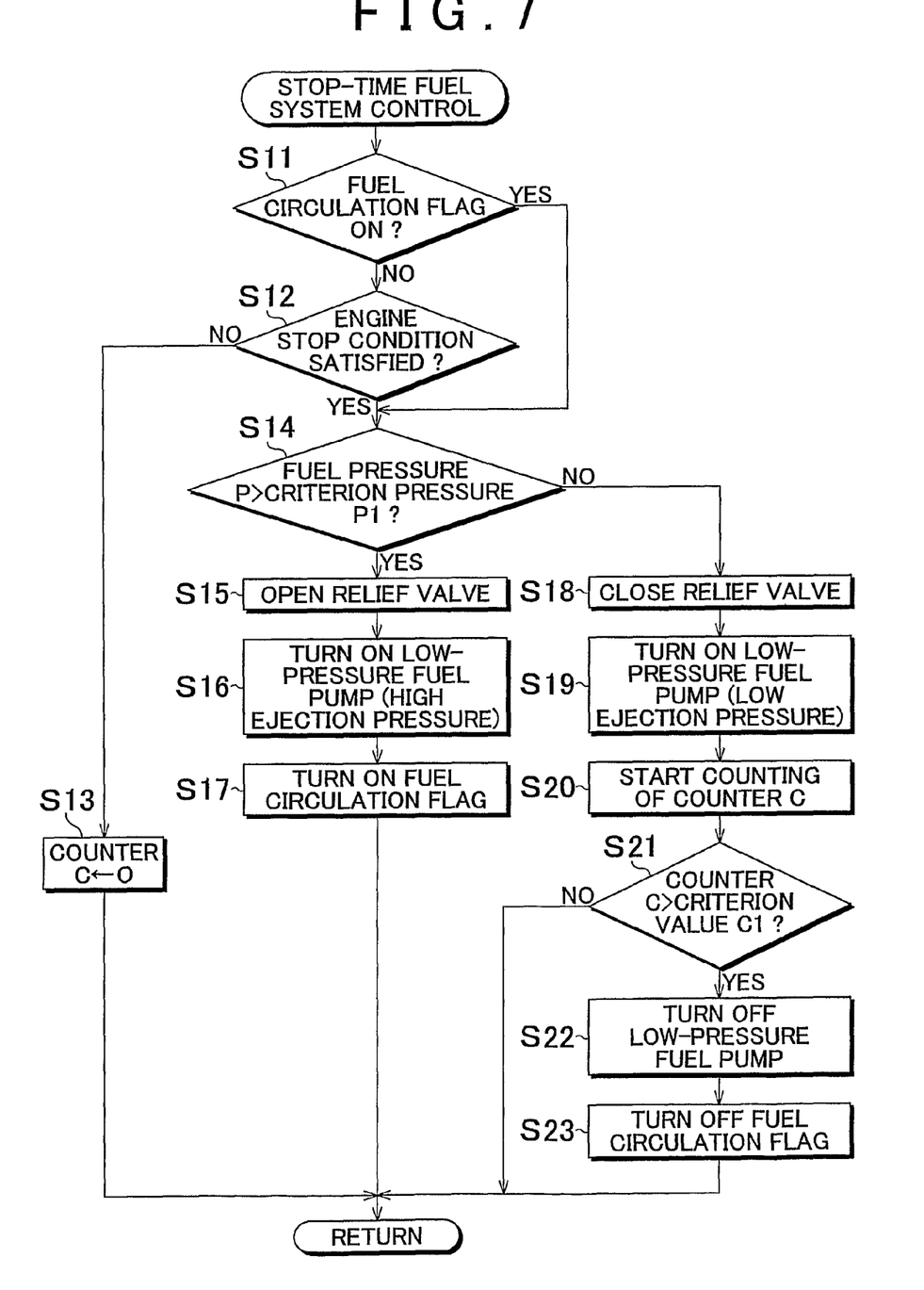
FIG. 7 is a flowchart showing a stop-time fuel system control routine executed by an ECU.

FIG. 7 shows a stop-time fuel system control routine that the ECU 60 executes to cool the fuel supply device 30 by circulating fuel between the fuel tank 31 and the delivery pipe 34 when the engine 1 is to be stopped. The control routine shown in FIG. 7 is executed in every predetermined cycle while the ECU 60 is in operation.

In the control routine of FIG. 7, the ECU 60 firstly judges in step S11 whether or not a fuel circulation flag for indicating that fuel is being circulated between the fuel tank 31 and the delivery pipe 34 is in an on-state. If the ECU 60 judges that the fuel circulation flag is in the on-state, the ECU 60 skips step S12 and proceeds to step S14. On the other hand, if it is judged that the fuel circulation flag is in the off-state, the process proceeds to step S12, in which the ECU 60 judges whether or not an engine stop condition for stopping the engine 1 is satisfied. The engine stop condition is satisfied, for example, in the case where the vehicle speed is 0 and the engine 1 has continued to be idly operated for a predetermined time, or the case where the ignition switch is switched to an off-state, etc. If it is judged that the engine stop condition is not satisfied, the process proceeds to step S13, in which the ECU 60, when stopping the engine 1, substitutes "0" in a counter C for measuring the time of operating the low-pressure fuel pump 32 after the switching of the relief valve 51 from the open state to the closed state. After that, the present cycle of the control routine ends.

If it is judged that the engine stop condition is satisfied, the process proceeds to step S14, in which the ECU 60 judges whether or not the pressure of fuel (fuel pressure) P in the delivery pipe 34 is greater than a predetermined criterion pressure P1 by referring to the output signal of the fuel pressure sensor 39. The predetermined criterion pressure P1 is a pressure for judging a timing to switch the relief valve 51 from the open state to the closed state when the engine 1 stops. Furthermore, the criterion pressure P1 may also be set so that the time it takes for the fuel pressure P in the delivery pipe 34 to drop from the lower limit value of a predetermined range in which the pressure P is controlled during operation of the engine 1 to the criterion pressure P1 is equal to the time that allows the fuel supply device 30 to be sufficiently cooled by circulating fuel from the fuel tank 31.

If it is judged that the fuel pressure P is greater than the criterion pressure P1, the process proceeds to step S15, in which the ECU 60 switches the relief valve 51 to the open state. Subsequently in step S16, the ECU 60 starts the low-pressure fuel pump 32. If the low-pressure fuel pump 32 is already operating, the low-pressure fuel pump 32 is caused to continue operating. On this occasion, the ECU 60 adjusts the rotation speed of the electric motor of the low-pressure fuel pump 32 or the like so that the ejection pressure of the low-pressure fuel pump 32 is set at a high pressure within an adjustable range. Subsequently in step S17, the ECU 60 switches the fuel circulation flag to the on-state. After that, the present cycle of the control routine ends.

If it is judged that the fuel pressure P is less than or equal to the criterion pressure P1, the process proceeds to step S18, in which the ECU 60 switches the relief valve 51 to the closed state. Subsequently in step S19, the ECU 60 starts the low-pressure fuel pump 32. If the low-pressure fuel pump 32 is already operating, the low-pressure fuel pump 32 is caused to continue operating. On this occasion, the ECU 60 sets the ejection pressure of the low-pressure fuel pump 32 at a low pressure within the adjustable range such that the pressure in the delivery pipe 34 is kept at or below a pressure such that fuel does not leak from the injectors 35 into the cylinders 2 during the stop of the engine 1.

Subsequently in step S20, the ECU 60 starts the counter C. If the time measurement by the counter C has already started, the time measurement is simply continued. Subsequently in step S21, the ECU 60 judges whether or not the value of the counter C is greater than a predetermined criterion value C1. The criterion value C1 is set, for example, as a time that allows the fuel pressure P in the delivery pipe 34 to decrease due to condensation of fuel vapor in the delivery pipe 34 and to rise to a pressure which allows the prompt startup of the engine 1 the next time the engine 1 is started. If it is judged that the value of the counter C is less than or equal to the criterion value C1, the present cycle of the control routine ends. On the other hand, if it is judged that the value of the counter C is greater than the criterion value C1, the process proceeds to step S22, in which the ECU 60 stops the low-pressure fuel pump 32. Subsequently in step S23, the ECU 60 switches the fuel circulation flag to the off-state. After that, the present cycle of the control routine ends.

In the control routine of FIG. 7, when the engine 1 is to be stopped, the relief valve 51 is switched to the open state, so that the fuel pressure in the delivery pipe 34 can be lowered. Therefore, the leakage of fuel from the injectors 35 into the cylinders 2 during stop of the engine 1 can be curbed. Hence, the deterioration of exhaust emission at the time of startup of the engine can be curbed, and the self-ignition at the time of the startup can be prevented. Furthermore, since the low-pressure fuel pump 32 is operated at the time of stopping the engine 1, cold fuel from the fuel tank 31 is supplied to the delivery pipe 34 to accelerate the cooling of the delivery pipe 34, which is generally disposed near the engine body 3. Therefore, the vaporization of fuel in the delivery pipe 34 is curbed, so that the occurrence of fuel vapor can be curbed. After the circulation of fuel for cooling the fuel supply device 30 ends, the relief valve 51 is switched to the closed state, so that fuel is stored in the delivery pipe 34. Hence, the next time of starting up the engine 1, the pressure in the delivery pipe 34 can be promptly raised.

When the relief valve 51 is in the open state, the ejection pressure of the low-pressure fuel pump 32 is set high within the adjustable range, so that a large amount of fuel can be supplied to the delivery pipe 34 for accelerating the cooling. On the other hand, when the relief valve 51 is in the closed state, the ejection pressure of the low-pressure fuel pump 32 is set low within the adjustable range, so that rise in the pressure within the delivery pipe 34 can be curbed. Therefore, the leakage of fuel from the injectors 35 into the cylinders 2 can be curbed.

If the duty control of the relief valve 51 by the ECU 60 is possible, the relief valve 51 may be duty-controlled in the process of step S15. In this case, for example, the relief valve 51 is duty-controlled so that the pressure in the delivery pipe 34 drops to a pressure that allows prompt startup of the engine 1 the next time the engine 1 is started.

The ECU 60 functions as operation control means in the invention, by controlling the operations of the relief valve 51 and the low-pressure fuel pump 32 when executing the control routine of FIG. 7 to stop the engine 1. Furthermore, the ECU 60 functions as ejection pressure change means in the invention, by executing the process of step S16 and step S19 in FIG. 7 to change the ejection pressure of the low-pressure fuel pump 32.

Figure 8:
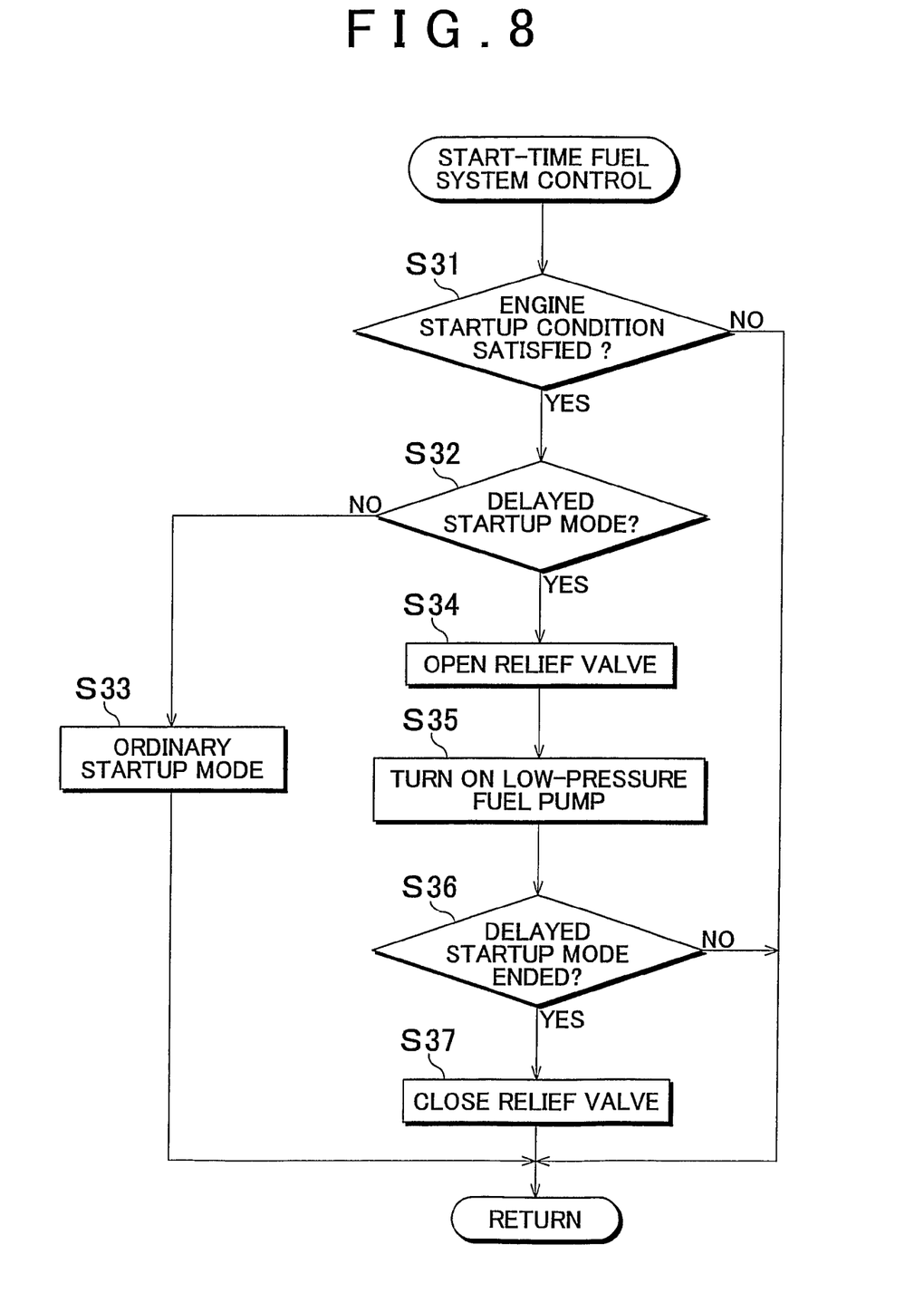
FIG. 8 is a flowchart showing a startup-time fuel system control routine executed by the ECU.

FIG. 8 shows a startup-time fuel system control routine that the ECU 60 executes to control the operations of the relief valve 51 and the low-pressure fuel pump 32 at the time of starting up the engine 1. The control routine shown in FIG. 8 is set as one of the routines executed at the time of start of the ECU 60, and is executed in every predetermined cycle by the ECU 60 after the ECU 60 has been started.

In the control routine of FIG. 8, the ECU 60 firstly judges in step S31 whether or not an engine startup condition is satisfied. The engine startup condition is satisfied, for example, if the ignition switch is switched to the on-state. Besides, with regard to an engine to which a so-called idle stop control is applied, that is, an engine that is stopped if a predetermined engine stop condition is satisfied during operation of the engine, it may be judged that the engine startup condition is satisfied also in the case where a predetermined re-startup condition is satisfied, for example, the accelerator pedal or the shift gear is operated by a driver, or the like, while the engine 1 is at a stop due to the idle stop control. If it is judged that the engine startup condition is not satisfied, the present cycle of the control routine ends.

On the other hand, if it is judged that the engine startup condition is satisfied, the process proceeds to step S32, in which the ECU 60 judges whether or not there is a need to enter the delayed startup mode at the time of starting the engine 1. Whether or not to enter the delayed startup mode is judged on the basis of, for example, the temperature of the exhaust purification catalyst 15. The delayed startup mode is entered in order to prevent HC from flowing into the exhaust purification catalyst 15 while the catalyst 15 is in an inactive state. Therefore, if the temperature of the exhaust purification catalyst 15 is higher than or equal to the activation temperature, it is judged that there is no need to enter the delayed startup mode. If it is judged that there is no need to enter the delayed startup mode, the process proceeds to step S33, in which the engine 1 is started up in an ordinary startup mode in which the engine 1 is cranked by the startup motor or the like and the fuel injection from the injectors 35 is performed. After that, the present cycle of the control routine ends.

If it is judged that there is a need to enter the delayed startup mode, the process proceeds to step S34, in which the ECU 60 switches the relief valve 51 to the open state. Subsequently in step S35, the ECU 60 starts the low-pressure fuel pump 32. If the low-pressure fuel pump 32 is already operating, the low-pressure fuel pump 32 is caused to continue operating.

Subsequently in step S36, the ECU 60 judges whether or not the delayed startup mode has ended. The end of the delayed startup mode can be judged, for example, by the pressure of the intake passageway 4. That is, when the pressure of the intake passageway 4 drops to a pressure that allows the switching valve 14 to be switched to the closed valve position and the switching valve 14 is actually switched to the closed valve position, it is judged that the delayed startup mode has ended. In the case where the switching valve 14 is switched to the closed valve position, exhaust passes in the casing 11 via the second passageway 13 and the first passageway 12 in that order as shown in FIG. 2, so that inflow of HC to the exhaust purification catalyst 15 being in the inactive state can be prevented if the fuel injection from the injectors 35 into the cylinders 2 is started. Therefore, when the pressure of the intake passageway 4 drops to the pressure that allows the switching valve 14 to be switched to the closed valve position, it is judged that the delayed startup mode has ended. If it is judged that the delayed startup mode continues, the present cycle of the control routine ends. On the other hand, if it is judged that the delayed startup mode has ended, the process proceeds to step S37, in which the ECU 60 switches the relief valve 51 to the closed state. After that, the present cycle of the control routine ends.

In the control routine of FIG. 8, during a period following the satisfaction of the engine startup condition and preceding the start of injection of fuel from the injectors 35, the relief valve 51 is switched to the open state, and the low-pressure fuel pump 32 is operated. Therefore, at the time of starting up the engine, the fuel vapor in the delivery pipe 34 can be discharged, and the fuel pressure in the delivery pipe 34 can be promptly raised. Therefore, the engine 1 can be promptly started up. Furthermore, since the relief valve 51 is switched to the open state and the low-pressure fuel pump 32 is operated, unnecessary rise in the fuel pressure of the delivery pipe 34 can be prevented. Therefore, the leakage of fuel from the injectors 35 into the cylinders 2 can be prevented, and the deterioration of exhaust emission can be prevented. Furthermore, in the control routine of FIG. 8, during a period from the affirmative judgment made in step S32 until the affirmative judgment is made in step S36, the relief valve 51 is switched to the open state and the low-pressure fuel pump 32 is operated. Therefore, this period may be regarded as a fuel circulation period in the invention.

The invention is not limited to the foregoing embodiment, but may be carried out in various forms. For example, the invention may be applied to diesel engines. Furthermore, the invention may be applied to so-called port-injection type internal combustion engines in which injectors are provided in intake ports, or may also be applied to internal combustion engines in which injectors are provided in intake ports and also in cylinders. Furthermore, the invention may also be applied to internal combustion engines in which the delayed startup mode is not entered at the time of startup.

The invention claimed is:

1. A fuel supply device for an internal combustion engine in which fuel drawn up from a fuel tank by a fuel feed pump is pressurized and stored in a pressure accumulator and the fuel stored in the pressure accumulator is injected from a fuel injection valve, comprising:
    a return passageway connecting the pressure accumulator and the fuel tank;
    a control valve that is provided on the return passageway and that is switched between a communicating position for connecting the pressure accumulator and the fuel tank in communication and a shutting-off position for shutting off the pressure accumulator and the fuel tank from each other in communication; and
    an operation control portion that switches the control valve to the communicating position and operates the fuel feed pump if a predetermined stop condition for stopping the internal combustion engine is satisfied,
    wherein if the predetermined stop condition is satisfied, the operation control portion initially switches the control valve to the communicating position and operates the fuel feed pump, and then switches the control valve to the shutting-off position and operates the fuel feed pump.

2. The fuel supply device for the internal combustion engine according to claim 1, further comprising an ejection pressure change portion that changes an ejection pressure of the fuel feed pump so that the ejection pressure of the fuel feed pump when the fuel feed pump is operated with the control valve switched to the communicating position is higher than the ejection pressure of the fuel feed pump when the fuel feed pump is operated with the control valve switched to the shutting-off position.

3. The fuel supply device for the internal combustion engine according to claim 1, wherein if a predetermined startup condition for starting up the internal combustion engine is satisfied, the operation control portion provides a fuel circulation period during which the control valve is switched to the communicating position and the fuel feed pump is operated, within a period from satisfaction of the predetermined startup condition until fuel is injected from the fuel injection valve.

4. The fuel supply device for the internal combustion engine according to claim 1, wherein the operation control portion provides a delayed startup mode that prevents inflow of hydrocarbon to an exhaust catalyst of the internal combustion engine which is in a catalytically inactive state if the predetermined startup condition for starting up the internal combustion engine is satisfied.

5. The fuel supply device for the internal combustion engine according to claim 1, wherein the predetermined stop condition is set based on at least one of a speed of a vehicle in which the internal combustion engine is mounted, an idle operation time of the internal combustion engine, and an on/off state of the an ignition switch of the vehicle.

6. The fuel supply device for the internal combustion engine according to claim 1, further comprising a pressure detection portion that detects a pressure in the pressure accumulator,
    wherein the operation control portion controls an operation of the control valve based on the pressure detected by the pressure detection portion, if the predetermined stop condition is satisfied.

7. The fuel supply device for the internal combustion engine according to claim 6, wherein;
    the operation control portion switches the control valve to the communicating position if the predetermined stop condition is satisfied and the pressure detected by the pressure detection portion is higher than a predetermined criterion pressure that is set taking into account a startup characteristic of the internal combustion engine; and the operation control portion switches the control valve to the shutting-off position if the predetermined stop condition is satisfied and the pressure detected by the pressure detection portion is less than or equal to the predetermined criterion pressure.

8. A fuel supply method for an internal combustion engine in which fuel drawn up from a fuel tank by a fuel feed pump is pressurized and stored in a pressure accumulator and the fuel stored in the pressure accumulator is injected from a fuel injection valve, comprising:

connecting the pressure accumulator and the fuel tank to each other in communication if a predetermined stop condition for stopping the internal combustion engine is satisfied; and shutting off the pressure accumulator and the fuel tank from each other in communication if the predetermined stop condition is not satisfied;

wherein if the predetermined stop condition is satisfied, initially the pressure accumulator and the fuel tank are connected in communication and the fuel feed pump is operated, and then the pressure accumulator and the fuel tank are shut off from each other in communication and the fuel feed pump is operated.

9. The fuel supply method for the internal combustion engine according to claim 8, further comprising changing an ejection pressure of the fuel feed pump so that the ejection pressure of the fuel feed pump when the fuel feed pump is operated with the pressure accumulator and the fuel tank connected to each other in communication is higher than the ejection pressure of the fuel feed pump when the fuel feed pump is operated with the pressure accumulator and the fuel tank shut off from each other in communication.

10. The fuel supply method for the internal combustion engine according to claim 8, wherein if a predetermined startup condition for starting up the internal combustion engine is satisfied, a fuel circulation period during which the pressure accumulator and the fuel tank are connected in communication and the fuel feed pump is operated is set within a period from satisfaction of the predetermined startup condition until fuel is injected from the fuel injection valve.

11. The fuel supply method for the internal combustion engine according to claim 8, further comprising:

detecting a pressure in the pressure accumulator; and controlling connection and shutting-off of communication between the pressure accumulator and the fuel tank if the predetermined stop condition is satisfied.

12. The fuel supply method for the internal combustion engine according to claim 11, further comprising connecting the pressure accumulator and the fuel tank in communication if the predetermined stop condition is satisfied and the pressure detected by the pressure detection portion is higher than a predetermined criterion pressure that is set taking into account a startup characteristic of the internal combustion engine, and shutting off the pressure accumulator and the fuel tank from each other in communication if the predetermined stop condition is satisfied and the pressure detected by the pressure detection portion is less than or equal to the predetermined criterion pressure.

* * * * *